(12) United States Patent
Kim

(10) Patent No.: US 7,261,101 B2
(45) Date of Patent: Aug. 28, 2007

(54) STEAM OVEN

(75) Inventor: Cheol Jin Kim, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 221 days.

(21) Appl. No.: 10/849,904

(22) Filed: May 21, 2004

(65) Prior Publication Data

US 2005/0051160 A1    Mar. 10, 2005

(30) Foreign Application Priority Data

Sep. 9, 2003    (KR) .................. 10-2003-0063003

(51) Int. Cl.
*A21B 1/08* (2006.01)
*A47J 27/04* (2006.01)
*A47J 27/16* (2006.01)

(52) U.S. Cl. .................. 126/369; 126/20; 219/401; 99/330

(58) Field of Classification Search ............... 126/369, 126/369.1, 369.2, 369.3, 20, 20.1, 20.2, 348, 126/33, 5; 219/401, 402; 99/330, 337
See application file for complete search history.

(56) References Cited

U.S. PATENT DOCUMENTS

| | | | | |
|---|---|---|---|---|
| 245,572 A * | 8/1881 | Smith | ............... | 126/20.2 |
| 1,628,895 A * | 5/1927 | McKenna | ............... | 126/20.2 |
| 1,659,064 A * | 2/1928 | Waters | ............... | 126/20.2 |
| 5,552,578 A * | 9/1996 | Violi | ............... | 219/401 |
| 5,875,705 A | 3/1999 | Knost | ............... | 126/21 A |
| 5,968,574 A | 10/1999 | Sann | ............... | 426/510 |
| 6,909,071 B2 * | 6/2005 | Shozo | ............... | 219/401 |

FOREIGN PATENT DOCUMENTS

| | | |
|---|---|---|
| EP | 0 191 267 | 8/1986 |
| EP | 1 275 333 | 1/2003 |
| EP | 1 386 544 | 2/2004 |
| FR | 2 638 376 | 5/1990 |
| JP | 54-160366 | 6/1978 |
| JP | 57-44302 | 8/1980 |

(Continued)

OTHER PUBLICATIONS

European Examination Report dated Sep. 29, 2006 for European Application No. 04 252 617.8-2301.

*Primary Examiner*—Josiah C. Cocks
(74) *Attorney, Agent, or Firm*—Staas & Halsey LLP

(57) ABSTRACT

A steam oven which selectively heats food at desired locations includes a cabinet to define a cooking cavity therein, a steam generator to generate steam, a plurality of steam feed pipes to guide and supply the steam generated by the steam generator into the cooking cavity, including outlet ends placed at a plurality of predetermined positions in the cooking cavity so as to evenly distribute the steam into the cooking cavity, and a plurality of steam valves mounted at predetermined portions of the plurality of steam feed pipes. The plurality of steam valves independently control the plurality of steam feed pipes so as to change positions from which the steam is discharged into the cooking cavity. Therefore, the steam oven of the present invention cooks the food in desired directions by allowing the plurality of the steam valves to independently control the plurality of steam feed pipes.

11 Claims, 3 Drawing Sheets

FOREIGN PATENT DOCUMENTS

| | | |
|---|---|---|
| JP | 7174340 | 7/1995 |
| JP | 7-243647 | 9/1995 |
| JP | 09-4849 | 1/1997 |
| JP | 2001-145568 | 5/2001 |
| JP | 2001-263667 | 9/2001 |
| JP | 2002-153380 | 5/2002 |
| JP | 3090752 | 10/2002 |
| JP | 2003-70642 A * | 3/2003 |
| JP | 2003-262338 | 9/2003 |

* cited by examiner

STEAM OVEN

CROSS-REFERENCE TO RELATED APPLICATIONS

This application claims the benefit of Korean Patent Application No. 2003-63003, filed Sep. 9, 2003 in the Korean Intellectual Property Office, the disclosure of which is incorporated herein by reference.

BACKGROUND OF THE INVENTION

1. Field of the Invention

The present invention relates, in general, to steam ovens and, more particularly, to a steam oven to selectively heat food in desired directions.

2. Description of the Related Art

Generally, steam ovens are cooking apparatuses that cook food by generating steam and discharging the steam onto the food.

Conventional steam ovens include a cabinet to define a cooking cavity therein, a steam generator to supply steam into the cooking cavity, and a steam feed pipe to guide and feed the steam generated from the steam generator to a lower portion of the cooking cavity so as to discharge the steam into the cooking cavity from the lower portion of the cooking cavity.

Accordingly, the steam, generated by the steam generator and passing through the steam feed pipe, is discharged from the lower portion of the cooking cavity to a rack installed in the cooking cavity, so that food placed on the rack is cooked by heat of the steam discharged into the cooking cavity.

The above-mentioned conventional steam ovens are advantageous in that the food is evenly cooked, but are problematic in that the conventional steam ovens cannot effectively cook various kinds of foods because the steam ovens do not have any means to selectively cook the food in desired directions.

Furthermore, in case that a plurality of racks are sequentially provided in a multi-rack arrangement in the cooking cavity, because the steam discharged from the lower portion of the cooking cavity is mainly discharged to a rack provided at a lower portion in the cooking cavity, the conventional steam ovens may not evenly cook foods that are placed on the upper and lower racks provided at upper and lower portions in the cooking cavity.

SUMMARY OF THE INVENTION

Accordingly, it is an aspect of the present invention to provide a steam oven which selectively heats food in desired directions.

It is another aspect of the present invention to provide a steam oven which evenly cooks foods placed on upper and lower racks provided at upper and lower portions in the cooking cavity.

Additional aspects and/or advantages of the invention will be set forth in part in the description which follows and, in part, will be obvious from the description, or may be learned by practice of the invention.

The above and/or other aspects are achieved by providing a steam oven, having a cabinet to define a cooking cavity therein, a steam generator to generate overheated steam, and a plurality of steam feed pipes to guide and supply the overheated steam generated by the steam generator into the cooking cavity, including outlet ends placed at a plurality of predetermined positions in the cooking cavity so as to evenly distribute the overheated steam into the cooking cavity.

According to an aspect of the present invention, the steam oven may further include a plurality of steam valves mounted at predetermined portions of the plurality of steam feed pipes. The plurality of steam valves independently control the plurality of steam feed pipes so as to change positions from which the overheated steam is discharged into the cooking cavity.

According to an aspect of the present invention, the plurality of steam feed pipes may include an upper steam feed pipe, including an outlet end placed at a predetermined portion of an upper wall of the cooking cavity to discharge the overheated steam from the steam generator into the cooking cavity in a downward direction, a lower steam feed pipe, including an outlet end placed at a predetermined portion of a lower wall of the cooking cavity to discharge the overheated steam from the steam generator into the cooking cavity in an upward direction, and a side steam feed pipe, including an outlet end placed at a predetermined portion of a sidewall of the cooking cavity to discharge the overheated steam from the steam generator into the cooking cavity in a sideward direction.

According to an aspect of the present invention, the cooking cavity may include a plurality of racks provided at upper and lower positions in the cooking cavity to support foods thereon. The side steam feed pipe may include a plurality of side steam feed pipes placed at upper and lower portions of the sidewall of the cooking cavity so as to respectively discharge the overheated steam from the steam generator into spaces defined between the plurality of racks in the cooking cavity.

According to an aspect of the present invention, the steam generator may include a steam generating vessel communicating with the cooking cavity through the plurality of steam feed pipes, including a predetermined amount of water contained in the steam generating vessel, and a first heater to generate steam. The first heater is installed in the steam generating vessel and immersed in the water contained in the steam generating vessel. The steam generator may further include a second heater to generate the overheated steam by further heating the steam generated by the first heater.

According to an aspect of the present invention, the above and/or other aspects are achieved by providing a steam oven having a cabinet to define a cooking cavity therein, a steam generator to generate steam, a plurality of steam feed pipes to guide and supply the steam generated by the steam generator into the cooking cavity, including outlet ends placed at a plurality of predetermined positions in the cooking cavity so as to evenly distribute the steam into the cooking cavity, and a plurality of steam valves respectively mounted at predetermined portions of the plurality of steam feed pipes. The plurality of steam valves independently controlling the plurality of steam feed pipes so as to change positions from which the steam is discharged into the cooking cavity.

According to an aspect of the present invention, the plurality of steam feed pipes may include an upper steam feed pipe, including an outlet end placed at a predetermined portion of an upper wall of the cooking cavity to discharge the steam from the steam generator into the cooking cavity in a downward direction, a lower steam feed pipe, of which an outlet end is placed at a predetermined portion of a lower wall of the cooking cavity to discharge the steam from the steam generator into the cooking cavity in an upward direction, and a side steam feed pipe, including an outlet end placed at a predetermined portion of a sidewall of the cooking cavity to discharge the steam from the steam generator into the cooking cavity in a sideward direction.

According to an aspect of the present invention, the cooking cavity may include a plurality of racks provided at upper and lower positions in the cooking cavity to support foods thereon. The side steam feed pipe may include a plurality of side steam feed pipes placed at upper and lower portions of the sidewall of the cooking cavity so as to discharge the steam from the steam generator into spaces defined between the plurality of racks in the cooking cavity.

According to an aspect of the present invention, the steam generator may include a steam generating vessel to communicate with the cooking cavity through the plurality of steam feed pipes, including a predetermined amount of water contained in the steam generating vessel, and a heater to generate steam. The heater is installed in the steam generating vessel and contacts the water contained in the steam generating vessel.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
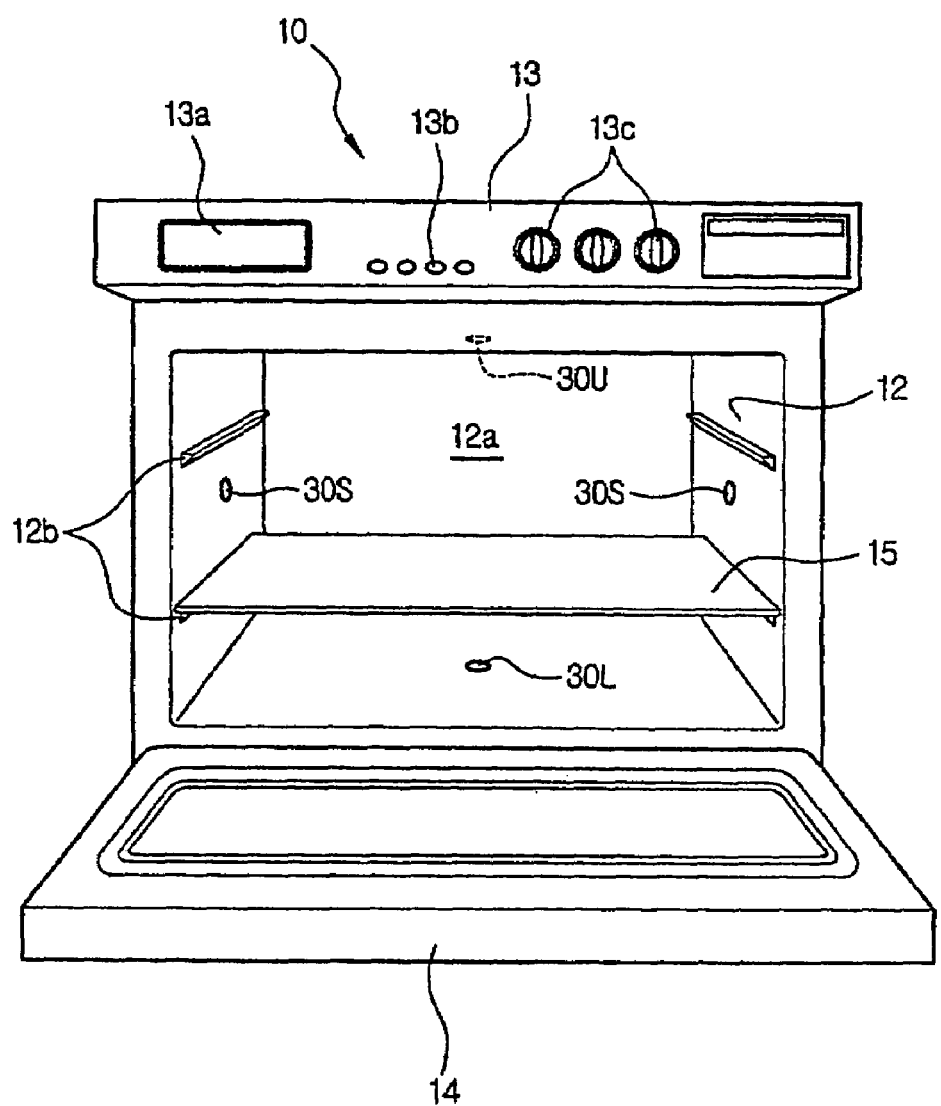
FIG. 1 is a front perspective view of a steam oven, according to a first embodiment of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

Figure 2:
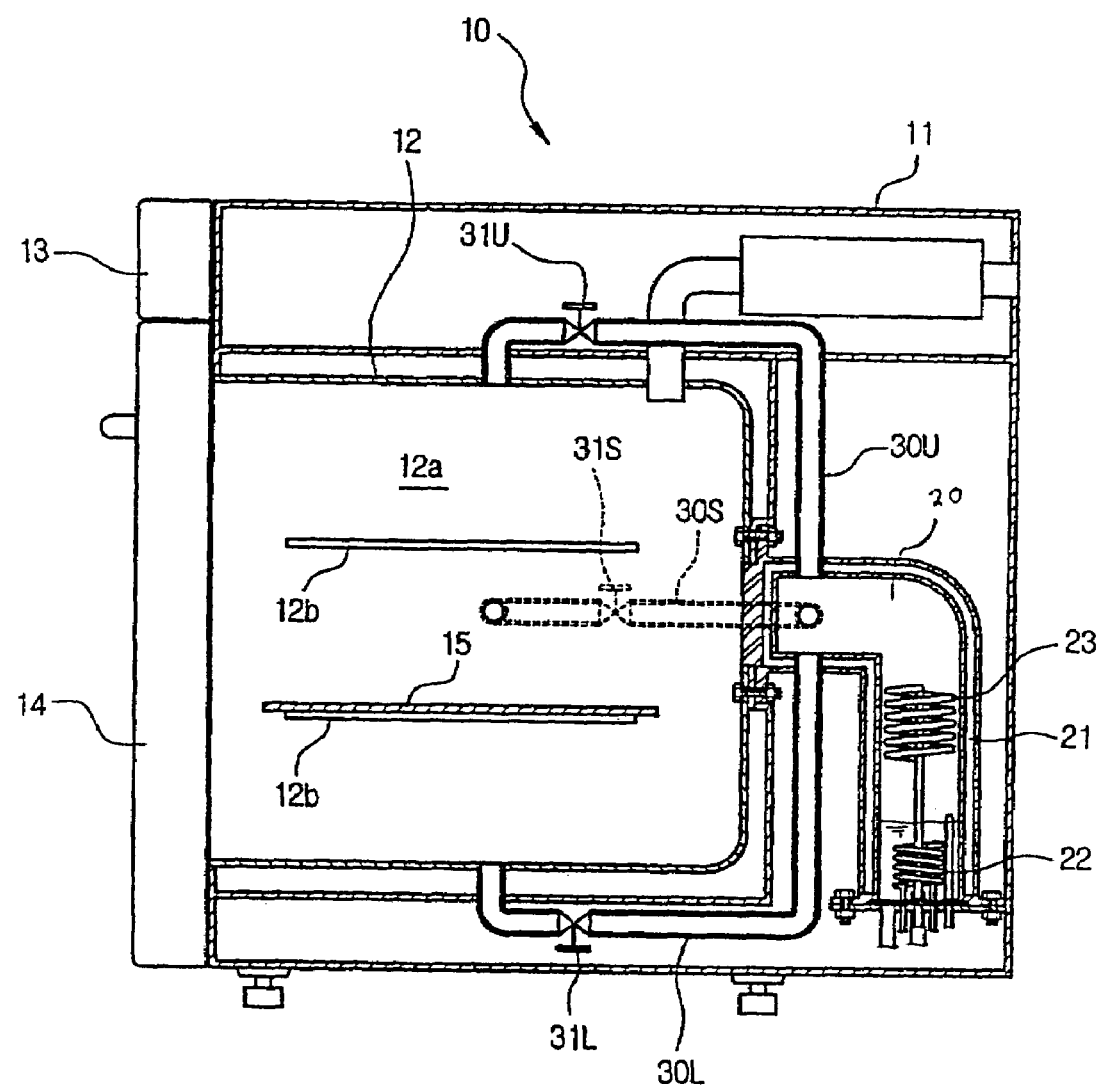
FIG. 2 is a side sectional view showing an internal construction of the steam oven of FIG. 1.

As shown in FIGS. 1 and 2, a steam oven according to a first embodiment of the present invention includes a cabinet 10 which forms an outer appearance of the steam oven and defines a cooking cavity 12a therein, and a steam generator 20 which generates overheated steam so as to supply the overheated steam into the cooking cavity 12a.

The cabinet 10 includes an outer casing 11 and an inner casing 12. The inner casing 12 is installed in the outer casing 11 spaced apart from the outer casing 11, and defines the cooking cavity 12a therein. A control unit 13, includes a display 13a to display an operational state of the steam oven thereon, various kinds of control buttons 13b, and control switches 13c, provided at an upper portion of the cabinet 10.

The outer casing 11 and the inner casing 12 are respectively open at a front thereof so as to allow a user to place and remove foods into and from the cooking cavity 12a. A door 14, having a lower end attached to a lower portion of the cabinet 10 by hinges, is provided at the open front of the cooking cavity 12a. The door 14 is opened downward and closed upward so as to open and close the cooking cavity 12a.

A rack 15 is provided in the cooking cavity 12a to support food thereon. The rack 15 is removably installed in the cooking cavity 12a to slide along two guide rails 12b which are oppositely formed on inner surfaces of both sidewalls of the inner casing 12 to support the rack 15. In the embodiment of the present invention, a plurality of racks 15 and a plurality of guide rails 12b may be placed at upper and lower positions in the cooking cavity 12a so as to support several items of foods on the racks 15 and effectively cook the foods during a cooking operation. In the first embodiment of the present invention, the upper and lower guide rails 12b are respectively formed at upper and lower positions on the inner surfaces of both sidewalls of the inner casing 12, so that upper and lower racks 15 are respectively installed at the upper and lower positions in the cooking cavity 12a forming a two-rack arrangement. Furthermore, a temperature sensor (not shown) is installed in the cooking cavity 12a so as to monitor a temperature of the cooking cavity 12a.

In the meantime, as shown in FIG. 2, the steam generator 20 includes a steam generating vessel 21 containing a predetermined amount of water. The steam generating vessel 21 includes a first heater 22 mounted to a lower portion in the steam generating vessel 21 to boil the water, thus generating steam, and a second heater 23 mounted to an upper portion in the steam generating vessel 21 to further heat the steam generated by the first heater 22, thus producing overheated steam. Accordingly, the water contained in the steam generating vessel 21 is boiled to generate the steam by the first heater 22, and the steam rises to the upper portion in the steam generating vessel 21. Sequentially, the steam is overheated by the second heater 23 mounted at the upper portion of the steam generating vessel 21 further heating the steam.

Furthermore, in the steam oven of the present invention, a plurality of steam feed pipes 30U, 30L, and 30S are arranged around the cooking cavity 12a so as to guide and supply the overheated steam generated by the steam generator 20 into the cooking cavity 12a.

The steam feed pipes 30U, 30L, and 30S are connected to the steam generator 20 at inlet ends thereof, and are connected to the cooking cavity 12a at outlet ends thereof so as to feed the overheated steam from the steam generator 20 into the cooking cavity 12a. The outlet ends of the steam feed pipes 30U, 30L, and 30S are respectively placed at a plurality of predetermined positions of upper, lower and sidewalls of the cooking cavity 12a, so that the overheated steam is discharged into the cooking cavity 12a in desired directions to selectively heat desired parts of the food placed in the cooking cavity 12a.

That is, in the first embodiment of the present invention, the steam feed pipes comprise four steam feed pipes 30U, 30L, and 30S (two of them) of which the outlet ends are respectively placed at predetermined positions of the upper wall, lower wall, and both sidewalls of the cooking cavity 12a so as to discharge the overheated steam into the cooking cavity 12a in a downward, upward, and sideward direction.

The four steam feed pipes 30U, 30L, and 30S (two of them) includes an upper steam feed pipe 30U, having an outlet end placed at a predetermined portion of the upper wall of the cooking cavity 12a to discharge the overheated steam into the cooking cavity 12a in a downward direction, a lower steam feed pipe 30L, having an outlet end placed at a predetermined portion of the lower wall of the cooking cavity 12a to discharge the overheated steam into the cooking cavity 12a in an upward direction, and two side steam feed pipes 30S, having outlet ends placed at predetermined portions of both sidewalls of the cooking cavity 12a to discharge the overheated steam into the cooking cavity 12a in a sideward direction.

Furthermore, a plurality of steam valves 31U, 31L, and 31S (two of them) are respectively mounted at predetermined portions of the steam feed pipes 30U, 30L, and 30S (two of them) so as to control the steam feed pipes 30U, 30L, and 30S (two of them). Due to the above-mentioned construction, the overheated steam is discharged into the cooking cavity 12a from only desired positions of the upper, lower and sidewalls of the cooking cavity 12a by operating the steam valves 31U, 31L, and 31S (two of them) which respectively control the steam feed pipes 30U, 30L, and 30S (two of them) respectively placed at upper, lower, and side portions of the cooking cavity 12a. Accordingly, the steam oven of the present invention heats the food in desired directions within the cooking cavity 12a.

That is, when only the upper steam pipe 30U is open by controlling the plurality of steam valves 31U, 31L, and 31S (two of them), the food is slightly roasted with the overheated steam directly discharged from the upper steam pipe 30U onto the food. When only the lower steam pipe 30L is open by controlling the steam valves 31U, 31L, and 31S (two of them), heat of the overheated steam is transferred to the foods via the racks 15 and, simultaneously, the overheated steam is distributed within the cooking cavity 12a after the overheated steam contacts a lower surface of the lower rack 15. Therefore, the food is evenly cooked with a lower part of the food being initially cooked and an upper part being cooked last by the overheated steam which is evenly distributed in the cooking cavity 12a, thus evenly increasing a temperature in the cooking cavity 12a.

Figure 3:
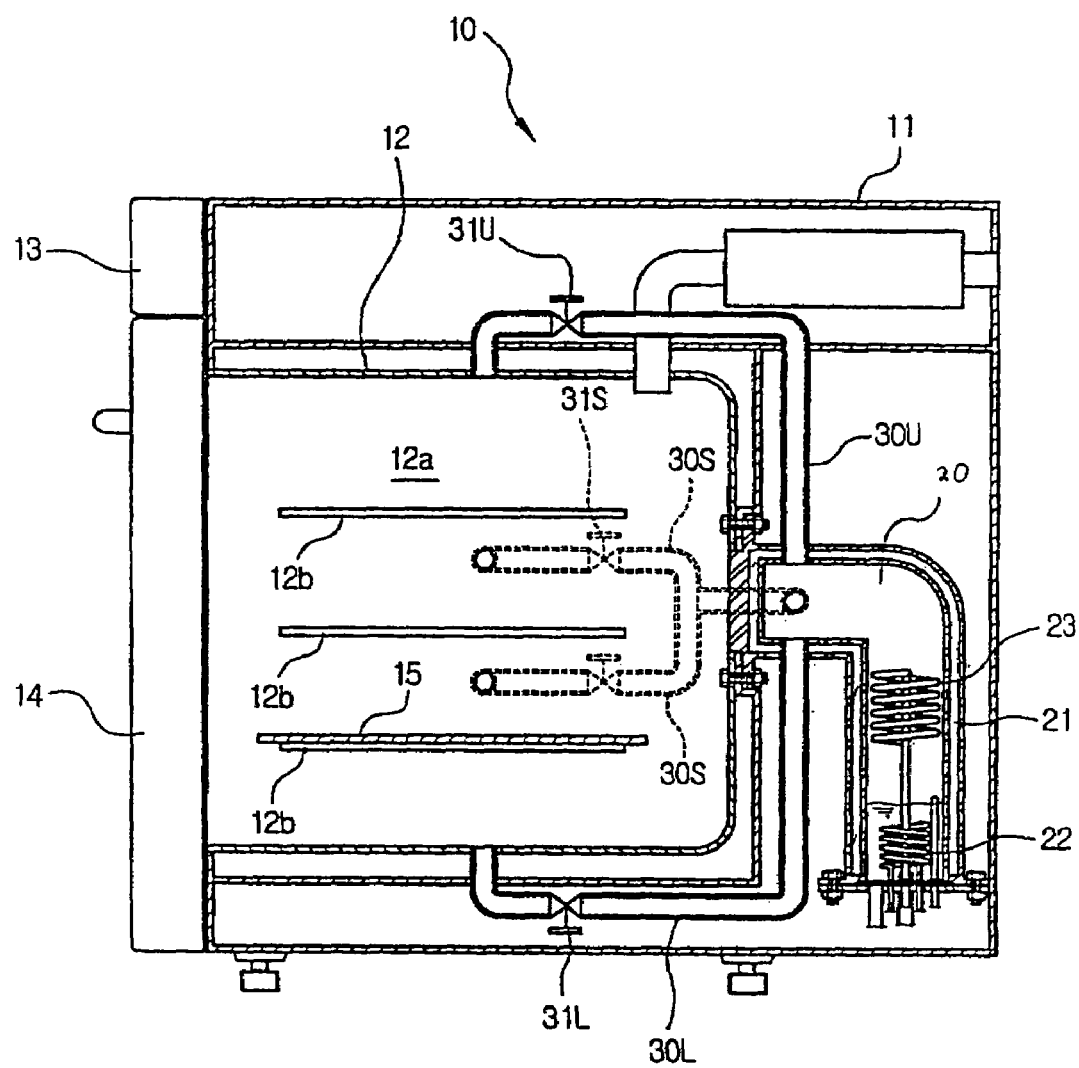
FIG. 3 is a side sectional view showing an internal construction of a steam oven, according to a second embodiment of the present invention.

In the first embodiment of the present invention, the upper and lower racks 15 are placed at the upper and lower positions in the cooking cavity 12a. The side steam feed pipes 30S, having the outlet ends aligned with a space between the upper and lower racks 15, are respectively placed at both sidewalls of the cooking cavity 12a so as to discharge the overheated steam into the space defined between the upper and lower racks 15 in the cooking cavity 12a. However, without being limited to the first embodiment of the present invention, three or more racks 15 may be placed in the cooking cavity 12a, as shown in FIG. 3 which shows a second embodiment of the present invention. In the second embodiment, a plurality of side steam feed pipes 30S are placed at the both sidewalls of the cooking cavity 12a, such that the outlet ends of the plurality of side steam feed pipes 30S are respectively aligned with spaces defined between the three or more racks 15. The overheated steam is thus discharged into spaces defined between the three or more racks 15 in the cooking cavity 12a.

In the embodiments of the present invention, the steam oven which cooks the food using the overheated steam is described. Without being limited to the embodiments of the present invention, the construction of the steam oven of the present invention may be applied to cooking apparatuses to cook foods using steam.

Next, the operation and effect of the steam oven of the present invention will be described herein bellow.

For example, in case of cooking a chicken using the steam oven of the present invention, the temperature in the cooking cavity 12a must increase to a high level to evenly cook the chicken in the cooking cavity 12a. Therefore, all the steam feed pipes 30U, 30L, and 30S are open so as to increase the temperature in the cooking cavity 12a by discharging the overheated steam from all the steam feed pipes 30U, 30L, and 30S into the cooking cavity 12a.

When the temperature sensor in the cooking cavity 12a detects the temperature in the cooking cavity 12a equal to or higher than a preset temperature, the upper steam feed pipe 30U and the side steam feed pipes 30S are respectively closed by the upper steam valve 31U and the side steam valves 31S, and only the lower steam feed pipe 30L discharges the overheated steam into the cooking cavity 12a.

Because the overheated steam, discharged from the lower steam feed pipe 30L into the cooking cavity 12a, forcefully contacts the lower surface of the lower rack 15, and is distributed within the cooking cavity 12a, the lower rack 15 is heated and, simultaneously, the temperature in the cooking cavity 12a increases. Therefore, the chicken placed in the cooking cavity 12a is evenly cooked with a lower part of the chicken being cooked initially and an upper part being cooked last.

Thereafter, to evenly finish cooking the chicken, only the upper steam feed pipe 30U is open while the side steam feed pipes 30S and the lower steam feed pipe 30L are closed. Accordingly, the overheated steam, which is discharged from the upper steam feed pipe 30U into the cooking cavity 12a, is directly discharged onto the chicken, slightly roasting the skin of the chicken, and finishing the cooking operation.

Furthermore, when the upper and lower racks 15 that support foods thereon are placed in the cooking cavity 12a in the multi-rack arrangement, the overheated steam, discharged from the upper and lower steam feed pipes 30U and 30L, may not be fed sufficiently into the spaces defined between the racks 15. However, in the above state, the foods in the racks 15 are evenly heated at all areas in the cooking cavity 12a by the overheated steam discharged from the side steam feed pipes 30S, aligned with the spaces defined between the racks 15.

As is apparent from the above description, because a steam oven of the present invention selectively heats food in desired directions by changing positions from which overheated steam is discharged into a cooking cavity, various kinds of foods are effectively cooked.

Also, in the steam oven of the present invention, even though a plurality of racks are placed in a multi-rack arrangement, foods supported on the racks 15 are evenly cooked regardless of positions at which the foods are placed, because the overheated steam is discharged into the cooking cavity at both sides as well as at a top and bottom.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A steam oven, comprising:
    a cabinet to define a cooking cavity therein;
    a steam generator to generate overheated steam;
    a plurality of steam feed pipes to guide and supply the overheated steam generated by the steam generator into the cooking cavity, including outlet ends placed at a plurality of predetermined positions in the cooking cavity so as to evenly distribute the overheated steam into the cooking cavity, the plurality including
        an upper steam feed pipe, including an outlet end connected to the cooking cavity at an upper wall thereof to discharge the overheated steam from the steam generator into the cooking cavity through the upper wall in a downward direction, a lower steam feed pipe, including an outlet end connected to the cooking cavity at a lower wall thereof to discharge the overheated steam from the steam generator into the cooking cavity through the lower wall in an upward direction, and a side steam feed pipe, including an outlet end connected to the cooking cavity at a sidewall thereof to discharge the overheated steam from the steam generator into the cooking cavity through the sidewall in a sideward direction; and a controller to control steam fed by the plurality of steam feed pipes, so that steam is first fed into the cooking cavity by the upper, lower, and side steam feed pipes until a selected cooking temperature is achieved therein, then steam is fed into the cooking cavity by only the lower steam feed pipe, and then steam is fed into the cooking cavity by only the upper steam feed pipe.

2. The steam oven according to claim 1, further comprising:

a plurality of steam valves mounted at predetermined portions of the plurality of steam feed pipes, the plurality of steam valves being controlled by the controller to independently control the flow of steam from the plurality of steam feed pipes so as to change positions from which the overheated steam is discharged into the cooking cavity.

3. The steam oven according to claim 1, wherein:

the cooking cavity comprises a plurality of racks provided at upper and lower positions in the cooking cavity respectively to support foods thereon; and the side steam feed pipe comprises a plurality of side steam feed pipes placed at upper and lower portions of the sidewall of the cooking cavity so as to discharge the overheated steam from the steam generator into spaces defined between the plurality of racks in the cooking cavity.

4. The steam oven according to claim 1, wherein the steam generator comprises:

a steam generating vessel communicating with the cooking cavity through the plurality of steam feed pipes, containing a predetermined amount of water;

a first heater to generate steam, the first heater installed in the steam generating vessel and contacting the water contained in the steam generating vessel; and a second heater to generate the overheated steam by further heating the steam generated by the first heater.

5. A steam oven comprising:

a cabinet to define a cooking cavity therein;

a steam generator to generate steam;

a plurality of steam feed pipes to guide and supply the steam generated by the steam generator into the cooking cavity, including outlet ends placed at a plurality of predetermined positions in the cooking cavity so as to evenly distribute the steam into the cooking cavity, the plurality including an upper steam feed pipe, including an outlet end connected to the cooking cavity at an upper wall thereof to discharge the overheated steam from the steam generator into the cooking cavity through the upper wall in a downward direction, a lower steam feed pipe, including an outlet end connected to the cooking cavity at a lower wall thereof to discharge the overheated steam from the steam generator into the cooking cavity through the lower wall in an upward direction, and a side steam feed pipe, including an outlet end connected to the cooking cavity at a sidewall thereof to discharge the overheated steam from the steam generator into the cooking cavity through the sidewall in a sideward direction;

a plurality of steam valves mounted at predetermined portions of the plurality of steam feed pipes, the plurality of steam valves independently controlling the plurality of steam feed pipes so as to change positions from which the steam is discharged into the cooking cavity, and a controller to control steam fed by the plurality of steam feed pipes, so that steam is first fed into the cooking cavity by the upper, lower, and side steam feed pipes until a selected cooking temperature is achieved therein, then steam is fed into the cooking cavity by only the lower steam feed pipe, and then steam is fed into the cooking cavity by only the upper steam feed pipe.

6. The steam oven according to claim 5, wherein:

the cooking cavity comprises a plurality of racks provided at upper and lower positions in the cooking cavity to support foods thereon; and the side steam feed pipe comprises a plurality of side steam feed pipes placed at upper and lower portions of the sidewall of the cooking cavity so as to discharge the steam from the steam generator into spaces defined between the plurality of racks in the cooking cavity.

7. The steam oven according to claim 5, wherein the steam generator comprises:

a steam generating vessel communicating with the cooking cavity through the plurality of steam feed pipes, containing a predetermined amount of water; and a heater to generate steam, the heater installed in the steam generating vessel contacting the water contained in the steam generating vessel.

8. A steam oven having a cooking cavity, comprising:

a plurality of steam feed pipes guiding and supplying steam generated by a steam generator into the cooking cavity, wherein the plurality of steam feed pipes include outlet ends placed at a plurality of predetermined positions in the cooking cavity so as to evenly distribute the steam into the cooking cavity, the plurality of steam feed pipes including an upper steam feed pipe, including an outlet end connected to the cooking cavity at an upper wall thereof discharging the overheated steam from the steam generator into the cooking cavity through the upper wall in a downward direction, a lower steam feed pipe, including an outlet end connected to the cooking cavity at a lower wall thereof discharging the overheated steam from the steam generator into the cooking cavity through the lower wall in an upward direction, and a side steam feed pipe, including an outlet end connected to the cooking cavity at a sidewall thereof discharging the overheated steam from the steam generator into the cooking cavity through the sidewall in a sideward direction;

a plurality of steam valves mounted at predetermined portions on the plurality of steam feed pipes, the plurality of steam valves independently controlling the plurality of steam feed pipes so as to change positions from which the steam is discharged into the cooking cavity; and a controller to control steam fed by the plurality of steam feed pipes, so that steam is first fed into the cooking cavity by the upper, lower, and side steam feed pipes until a selected cooking temperature is achieved therein, then steam is fed into the cooking cavity by only the lower steam feed pipe, and then steam is fed into the cooking cavity by only the upper steam feed pipe.

9. The steam oven according to claim 8, wherein:

the cooking cavity comprises a plurality of racks provided at upper and lower positions in the cooking cavity supporting foods thereon; and the side steam feed pipe further comprising a plurality of side steam feed pipes placed at upper and lower portions of the sidewall of the cooking cavity so as to discharge the overheated steam into defined spaces between the plurality of racks in the cooking cavity.

10. The steam oven according to claim 9, wherein outlet ends of the plurality of side steam feed pipes are respectively aligned with spaces defined between the plurality of racks.

11. The steam oven according to claim 8, wherein the steam generator comprises:

a steam generating vessel communicating with the cooking cavity through the plurality of steam feed pipes, containing a predetermined amount of water;

a first heater generating steam, the first heater installed in the steam generating vessel and contacting the water; and a second heater generating the overheated steam by further heating the steam generated by the first heater.

* * * * *